United States Patent
Norton (10) Patent No.: US 6,427,831 B1
(45) Date of Patent: Aug. 6, 2002

(54) CONVERTIBLE CONVEYOR BED AND METHOD

(76) Inventor: Frank B. Norton, 4354 W. Curtice Dr., Battlefield, MO (US) 65619

( * ) Notice: Subject to any disclaimer, the term of this patent is extended or adjusted under 35 U.S.C. 154(b) by 0 days.

(21) Appl. No.: 09/713,509

(22) Filed: Nov. 15, 2000

Related U.S. Application Data (60) Provisional application No. 60/166,459, filed on Nov. 19, 1999.

(51) Int. Cl.[7] .............................................. B65G 15/60
(52) U.S. Cl. .................. 198/841; 198/860.2; 198/861.1
(58) Field of Search ............................ 198/841, 860.2, 198/861.1

(56) References Cited

U.S. PATENT DOCUMENTS

| | | | | |
|---|---|---|---|---|
| 2,969,820 A | * | 1/1961 | Pulver ......................... | 198/841 |
| 3,115,236 A | * | 12/1963 | Anetsberger ................ | 198/841 |
| 4,067,428 A | * | 1/1978 | Shuttleworth ............ | 198/860.2 |
| 4,325,480 A | | 4/1982 | Butt ............................ | 198/841 |
| 4,509,637 A | | 4/1985 | Browning .................. | 198/472 |
| 4,598,819 A | | 7/1986 | Siegwart ................... | 198/861.1 |
| 4,793,470 A | | 12/1988 | Andersson .................. | 198/823 |
| 5,131,531 A | * | 7/1992 | Chambers ................... | 198/841 |
| 5,164,777 A | * | 11/1992 | Agarwal et al. ............ | 198/841 |
| 5,178,263 A | | 1/1993 | Kempen ................... | 198/836.1 |
| 5,205,400 A | | 4/1993 | Breuss et al. ............... | 198/812 |
| 5,421,451 A | | 6/1995 | Easton ..................... | 198/860.1 |
| 5,447,224 A | | 9/1995 | Gebhardt ................. | 198/861.1 |
| 5,529,171 A | | 6/1996 | Langenbeck ............. | 198/860.1 |
| 5,692,597 A | | 12/1997 | Ferguson ................... | 198/841 |
| 5,715,931 A | * | 2/1998 | Langenbeck ............. | 198/860.2 |
| 5,762,178 A | * | 6/1998 | Tarlton .................... | 198/860.2 |
| 5,797,481 A | | 8/1998 | Uber et al. ................. | 198/813 |
| 5,799,780 A | | 9/1998 | Steeb, Jr. et al. ........... | 198/823 |
| 5,826,703 A | | 10/1998 | Altemus, Jr. et al. ....... | 198/823 |
| 6,227,355 B1 | * | 5/2001 | White et al. ................ | 198/841 |

* cited by examiner

Primary Examiner—Joseph E. Valenza
(74) Attorney, Agent, or Firm—Jonathan A. Bay (57) ABSTRACT

A conveyor bed has opposed sides and transverse nose bars on the ends of the sides to form an open frame. The sides carry also rungs. Elongated wear strips lay on the rungs to form a deck for a conveyor to slide thereon. The ends of the sides are formed with open mortises. The nose bars extend between opposite lateral ends formed a T-headed tenons. The tenons releasably couple with the open mortises. Hence the nose bars are adapted to couple onto the ends of the sides be locked there by the felt weight of the conveyor rolling over the nose bars. The elongated wear strips have an upper edge forming a conveyor supporting surface and a lower edge formed with notches. The notches are sized for receiving the rungs. Thus the notched wear strips are adapted to be weighted down in place on the rungs by the weight of the conveyor sliding thereon. The notches are sized for closely fitting the rungs to better stabilize the wear strips from unwanted displacement. The mortise and tenon couplings as well as the notches and rungs are adapted to facilitate frequent cycles of disassembly and re-assembly of the conveyor bed for maintenance operations such as hose-down or clean-up. Also, the side rails can be cut in two to get a reduced length. Thus the bed is convertible into shorter lengths except that the nose bars are re-usable without modification.

19 Claims, 10 Drawing Sheets

CONVERTIBLE CONVEYOR BED AND METHOD

CROSS-REFERENCE TO PROVISIONAL APPLICATION(S)

This application claims the benefit of U.S. Provisional Application No. 60/166,459, filed Nov. 19, 1999.

BACKGROUND AND SUMMARY OF THE INVENTION

The invention generally relates to conveyor beds or frames and, more particularly, to a bed or frame construction which is convertible in size in at least in regards of run length and width, as well as methods of achieving the conversion(s) in size thereof.

It is an object of the invention to provide a conveyor bed for supporting a sliding conveyor thereon, which bed is produced from conveyor-engaging materials that have a low coefficient of sliding friction.

It is an alternate object of the invention that the above conveyor bed incorporate transverse nose bars on the ends where the conveyor rolls over and longitudinal wear strips extending between the transverse nose bars for providing intermediate support.

It is another object of the invention that the nose bars and wear strips be made of low friction materials, including plastics like polyethylene, polytetrafluoroethylene, nylon, polymers of acetyl resins and so on.

It is an additional object of the invention that either the wear strips or nose bars disassemble easily and without fasteners to facilitate convenient and frequent disassembly and re-assembly for maintenance purposes such as hose-down or cleaning operations.

It is a further object of the invention that the bed include side rails which are preformed with apertures and notches and the like so that the side rails can be severed in two and quickly be re-assembled into a converted bed assembly which is of reduced length than the original side rails before severance. That is, the line of severance is taken through an aperture so that the resulting slot or recess is adapted to receive a sliding portion of a nose bar or the like.

These and other aspects and objects are provided according to the invention in a conveyor bed assembly that has opposed sides and transverse nose bars on the ends of the sides to form an open frame. A deck is situated inside the frame to support a sliding conveyor thereon. The side members, more particularly, extend between opposite ends. The pair of transverse nose bars are adapted to be connected between respective pairs of the ends of the side members and thus form the open frame.

Either the nose bars or the side members are formed with slideway portions. Correspondingly, the other of the side members or the nose bars have portions formed as slide portions. That way, the nose bars and side members releasably couple or uncouple by the slide portions being received in or separated out of a given slideway by relative movement along a direction generally common with the plane of the deck. One advantage of this is that the nose bars are adapted to gain positional stability on the ends of the side members by the felt weight of the conveyor rolling over the nose bars. Another advantage is that the slideway and slide portions are adapted to facilitate ease of frequent cycles of disassembly and re-assembly for maintenance operations such as hose-down or cleaning operations.

To turn attention to the deck, it optionally comprises a plurality of other transverse members (eg., other than the nose bars) adapted to be connected between the side members, as intermediate the nose bars, to form a ladder-like assembly. There are a plurality of elongated wear strips that lay on and releasably couple to the transverse members at spaced positions between the opposed side members and intermediate the nose bars. The elongated wear strips provide the deck that supports the sliding conveyor.

Either the wear strips or transverse members are formed with recess portions. Correspondingly, the other of the transverse members or the wear strips have portions formed as inter-positioning portions. That way, the wear strips and transverse members releasably couple or uncouple by the inter-positioning portions being received in or separated out of a given recess therefor by relative movement along a direction generally perpendicular to a plane of the deck. An advantage provided by this arrangement is that it facilitates ease of frequent cycles of disassembly and re-assembly for maintenance operations such as hose-down or cleaning operations.

To revisit the connection between the side members and nose bars, it may optionally comprise the side members' ends being formed with open mortises which define the above-recited slideways. Correspondingly, each nose bar is produced to extend between spaced lateral edges that are formed with T-headed tenon portions that define the above-recited slides.

A further aspect of the invention has it convertible to reduced lengths from original lengths in accordance with the following. That is, the side members might be formed with elongated apertures intermediate each's ends. That way, the side members are convertible from a given length between the ends to a reduced length by severing each side member through a given elongated aperture into at least one use piece and another piece such that the severed aperture in the use piece serves as a succeeding open mortise for accepting a given T-headed tenon of one of the nose bars. Needless to say, the nose bars are re-usable without modification.

Correspondingly, the elongated wear strips are sizable by severance each accordingly to fit such severed wear strips between the nose bars of the reduced-length side members.

To revisit the connection between the wear strips and the transverse members, the transverse members optionally comprise rungs. Such rungs need not be limited to uniformly round stock though that might be preferred. The wear strips have an upper edge forming a conveyor supporting surface and a lower edge formed with a series of notches. The notches are sized and arranged for receiving the rungs. Also, the wear strips (because of the notches) are adapted to gain positional stability on the rungs from the weight of the conveyor sliding across the upper edge. More preferred is if the wear strips are notched for closely fitting the rungs in order to further stabilize the wear strips from unwanted displacement on the rungs.

It is preferred that while the wear strips and nose bars are produced from materials having a low coefficient of sliding friction, the side and transverse members may be produced from any suitable material such as the preferred stainless steel stock. The wear strips and nose bars may be made from plastic materials. In accordance with the foregoing, the wear strips and nose bars disassemble and re-assembly very easily and without fasteners to allow frequent, fast maintenance such as hose-down or clean-up and the like. Additionally, the side rails are pre-perforated for cutting into pieces to convert the over-all encompassing conveyor bed from a size of an original length to a succeeding size of a reduced length. The nose bars are re-usable without modification. The wear strips need merely be trimmed to a shorter size. Otherwise, the slots needed in the side rails to accommodate the nose bars are brought into existence by the very act of severing through a strategically placed aperture in the side rail.

Additional aspects and objects of the invention will be apparent in connection with the discussion further below of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIGS. 6a through 6d comprise a series of reduced-scale near-side elevational views comparable to FIG. 5 except:

DETAILED DESCRIPTION OF THE PREFERRED EMBODIMENTS

Figure 1:
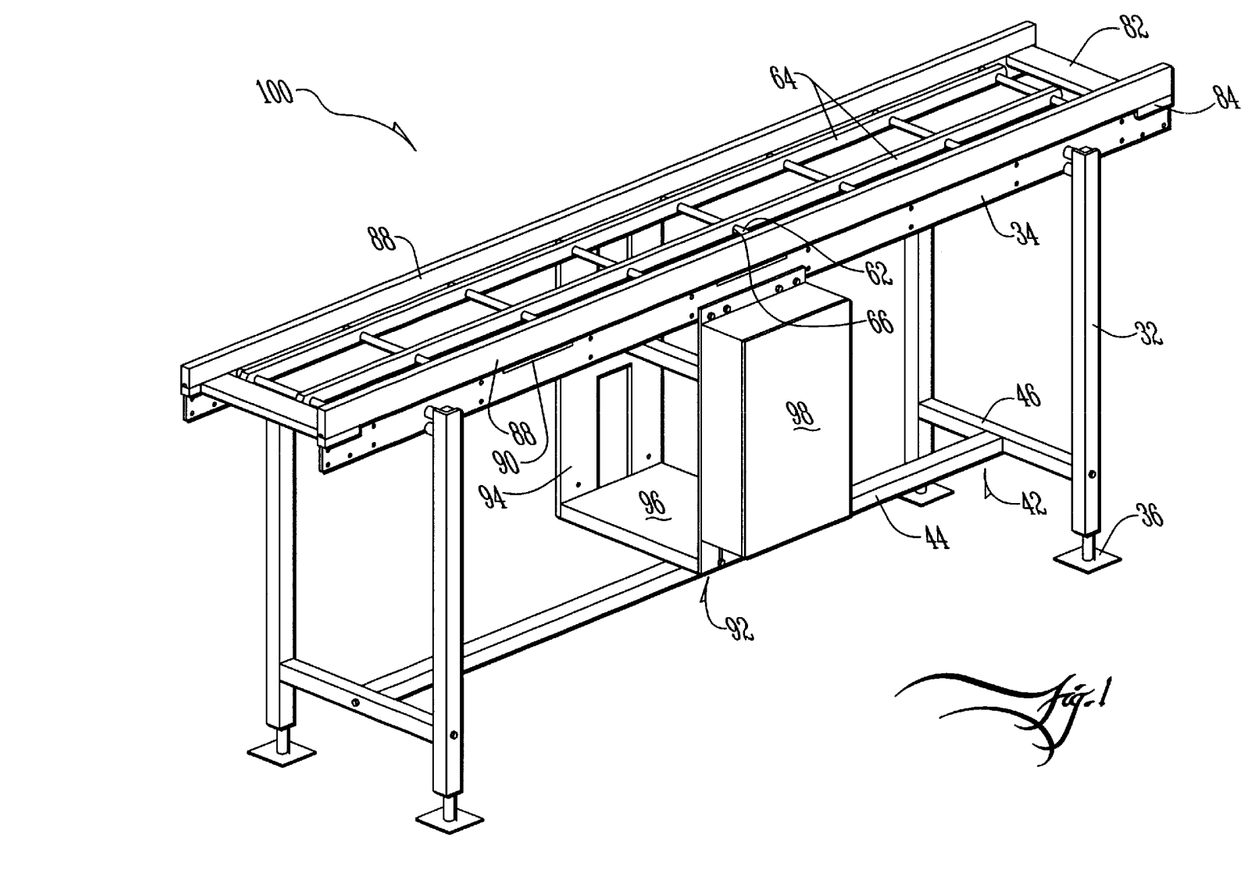
FIG. 1 is a perspective view of a convertible conveyor bed in accordance with the invention.
Figure 2:
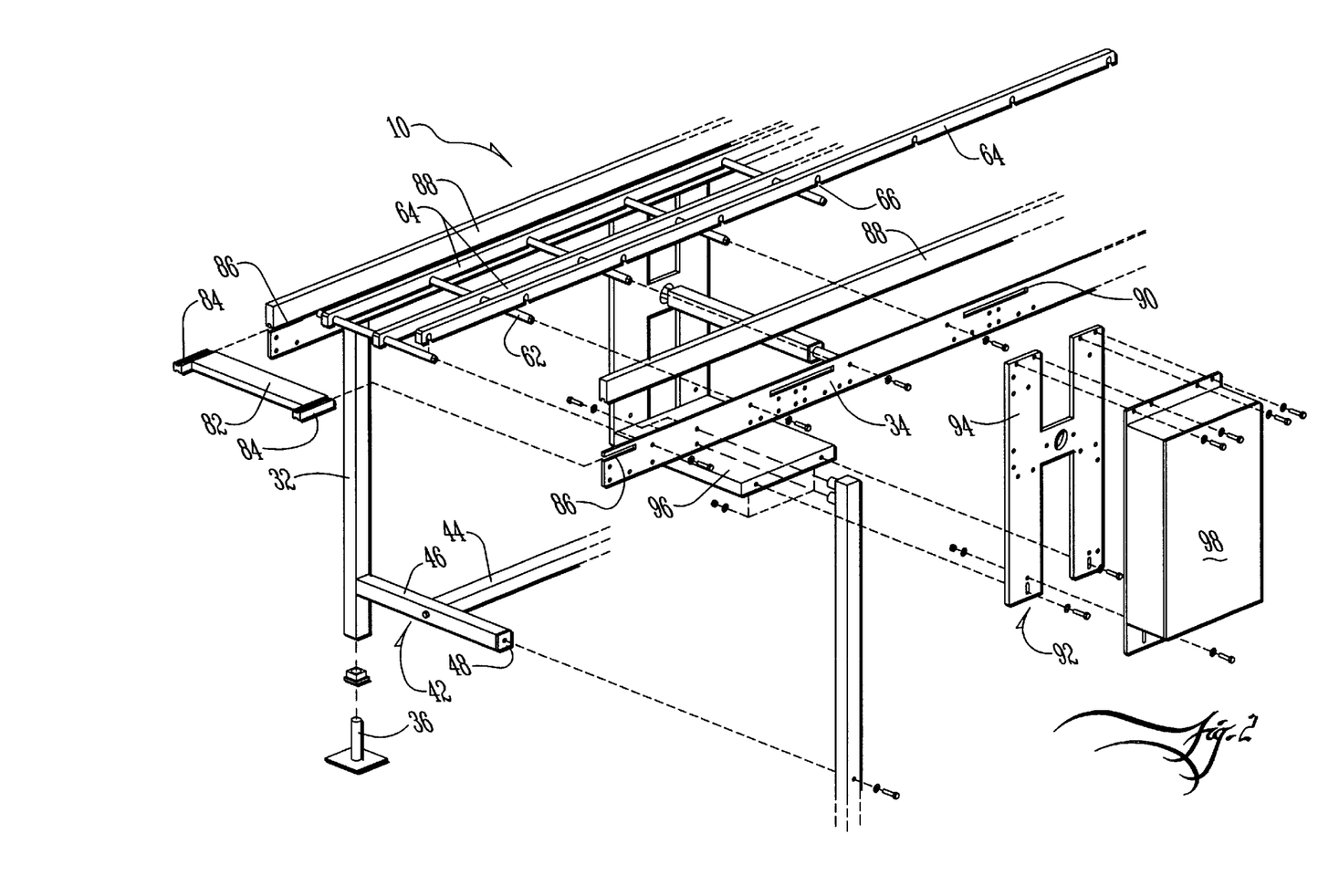
FIG. 2 is an exploded view thereof, with portions broken away.

FIGS. 1 and 2 show a convertible conveyor bed 100 and/or 10 in accordance with the invention. Preferably the bed 10/100 is produced by a producer or provided by a provider in a disassembled kit form 10 (ie., FIG. 2). That way, the kit 10 of the bed 100 stores and ships in a more compact form. The ultimate recipient of the disassembled kit 10 of the bed 100 is presumably the customer or end-user who assembles the kit 10 and installs the resultant bed 100 in a process line such as a food process line or the like.

To facilitate ease of assembly/disassembly, the bed 100's major components fasten together by mechanical connections such as including without limitation, bolts or fasteners, or tongue-and-groove, (open) mortise and tenon, pin-and-socket, or slide-together or snap-together mating and the like, some of which will be more particularly described below. It is an object of the invention to eliminate the requirement of welding from the kit 10 assembling process. Whereas as some of the kit pieces may be welded (but preferably not), such weldments are preferably limited to such places where there is no advantage in providing disassembly or the like, or likely ever any desire in wanting to disassemble at such welds.

The predominate preferred materials to fabricate the bed 100 from comprise in major part just two materials. One material ought to be a sufficiently corrosion-resistant, non-absorptive rigid material to provide the main structural integrity for the bed 100. In a preferred embodiment of a proof-of-concept prototype, to date this has comprised without exclusion of other suitable materials, food-grade stainless steel. The other major material ought to be a sufficiently non-absorptive material having a relative low coefficient of sliding friction (the suitable class of materials fitting this description largely are inherently noncorrosive) to support the belt (not shown) in its sliding transit thereby. In a preferred embodiment of a proof-of-concept prototype, to date this has comprised without exclusion of other suitable materials, ultra-high molecular weight ("UHMW") polyethylene ("PET").

Given the foregoing, the bed 100 comprises a set of legs 32 supporting a pair of side racks 34. Among other choices, the legs 32 can be square stainless tube, or angle or channel stock as well. Also among other choices, the side racks 34 can be formed by being precision cut from full sheet stock by water jet or laser, as well as punched or formed from strips of stainless plate. The legs 32 arise out of threaded feet 36, preferably also stainless, the threading thereof allowing some leveling adjustment of the bed 100. The legs 32 might optionally be given some low bracing 42 such as the I-formation shown, comprising an elongated stem 44 and opposite end cross bars 46. The bracing 42 is all composed of stainless tube that allows itself to bolt together in assembly as shown by the drawings. The ends of any given tube (eg., 44 or 46) which takes a bolt is capped or plugged with a closure 48 (see, eg., FIG. 3). The closure 48 might either be directly formed with internal thread for taking the bolt or else given a captive nut. Preferably the closure 48 is press-formed or -snapped into a predominantly permanent connection with its associated tube (eg., 44 or 46 and the like). However, the connection between the closure 48 and tube 44 or 46 and so on, comprises one of the instances where it might be relatively practical to complete that connection by means of welding because there is little if no advantage in facilitating disassembly between the closure 48 and say tubes 44 or 46.

The side racks 34 are hung from the inboard sides of the legs 32 rather than being posted up on them. This is accomplished by bolts, washers and spacers as shown. Preferably the leg 32 is provided a through-hole in its wall (not in view) near its upper extremity, with a captive nut (not shown) inside the leg 32's core for taking the bolt. This arrangement eliminates projections on the outboard sides of the legs 32 near their upper extremities.

The two parallel racks 34 support a series of rungs 62 (eight shown on about one foot (30 cm) spacing). The rungs 62 preferably are formed from stainless bar tapped with internal thread in the ends. The rungs 62 hang between the racks 34 by means of bolts and washers and the like. As seen spanning axially across the tops of the rungs 62, there are a set of wear bars 64. The wear bars 64 are preferably formed out of UHMW PET or the like for the purposes as given above. The wears bars 64 rest stationary on the rungs 62 while the belt (not shown) endlessly transits across the top of the wear bars 64 as the belt courses its way in its loop. The wear bars 64 include a series of notches 66 in them at spacing equal to the spacing of the rungs 62. The notches 66 are sized to provide a close-fitting frictional grip on the rungs 62. Hence the wear bars 64 more or less snap on and off the rungs 62 for assembly and disassembly. The drawings show the bed 100 is provided with three like wear bars 64. FIG. 2 shows the near wear bar 64 disassembled and elevated above where it assembles with the rungs 62. The middle and far side wear bars 64 are shown assembled.

An advantage in providing such convenience of assembly and disassembly with the wear bars 64 includes the aspect of maintenance as well as hose-down and cleaning operations. In food process lines, there is a regular frequent schedule on which a bed 100 like this must be cleaned. This entails undoing the belt (not shown) to set it aside in order to remove the wear bars 64 for cleaning.

Indeed, this arrangement of wear bar 64 attachment (eg., notches 66 and rungs 62) is advantageous for manifold diverse other types of conveyor beds, tables and/or structures than just the modular bed 10/100 shown by the drawings. Indeed, the rungs 62 or whatever spanners or cross bars (not shown) that are utilized can be set by fasteners or welding to the whatever other carrying frame may typify a given conveyor structure at whatever spacings the notches 66 are spaced in the wear bars 64 (eg., twelve (12) inch spacings in the examples shown by the drawings, but this may be varied). It's not so significant in every conveyor structure that the rungs 62 are removable as more highly significant and desirable that the wear bars 64 are easily installed and/or removed by the convenience of snap-on or snap-off connection and disconnection, as shown by the drawings including FIG. 2.

Figure 4:
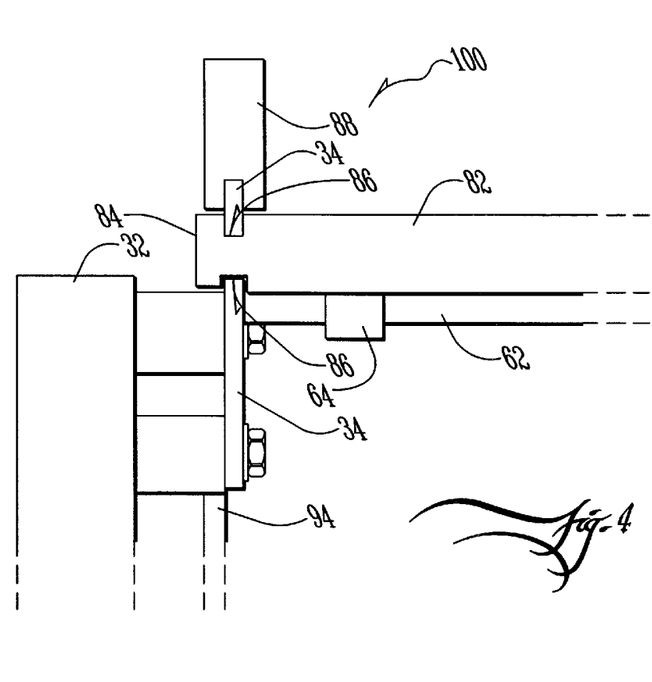
FIG. 4 is an enlarged scale view of detail IV in FIG. 3.

With reference back to the opposite racks 34, they extend between ends which are bridged by opposite nose bars 82. The nose bars 82, like the wear bars 64, are preferably formed out of UHMW PET or the like and again for the purposes given above. The nose bars 82 rest stationary in the ends of the racks 34 while the belt (not shown) endlessly courses around the nose bars 82 in its loop. The nose bars 82 are formed with T-headed tenons or slides 84 in their near and far sides. The T-headed slides are shaped and arranged to slide in open mortises or slideways 86 notched into the ends of the racks 34. The enlarged view of FIG. 4 shows one such T-headed slide 84 as slid into the open slideway or mortise 86 in the rack 34. FIG. 2 shows the nose bar 82 slid out in a state of pre-assembly and/or disassembly.

Also, the elongated top edges of the racks 34 are capped with bumpers 88 that act like fences. These bumpers 88 are optionally made out of UHMW PET or the like, as are the other non-fastener attached pieces 64 and 82. FIG. 1 shows the bumpers 88 assembled. FIG. 2 shows the near-side bumper 88 in a condition of pre-assembly or disassembly. FIG. 4 shows the tongue-and-groove connection between the rack 34's upper edge and the bumper 88's bottom. As was true with the wear bars 64, both the nose bars 82 and bumpers 88 disconnect so easily partly to facilitate of ease maintenance as for strip-down-and-cleaning operations.

The bed 100 includes a drive console 92 for mounting a drive motor (not shown) and associated drive gear (also not shown) for reducing the speed ratio and/or tensioning the belt (it not being shown either) and the like. FIG. 1 shows the drive console 92 assembled. FIG. 2 shows the drive console 92 in a condition of pre-assembly or disassembly.

Basically, the drive console 92 comprises a pair of opposite H-shaped hangers 94 which hang from bolted connections to the racks 34. The bottom of the H-shaped hangers 94 carry a motor-mounting platform 96. The upper half of the drive console provides mounting space for the drive gear (not shown). In most cases, the motor and drive gear will be coupled by a chain or toothed belt or the like (not shown), which is likely to project further outboard on the near-side of the bed 100. A cover 98 is provided to cover up the drive chain/belt.

As previously mentioned, an inventive aspect of the bed 100 is that it is made available to purchasers in a kit form 10:—ie., that is, in a state of pre-assembly in which all the components are disassembled. Presumably, the ultimate end-user/customer assembles the kit 10 for that user's own needs as for example, installation in such user's process line. Only hand tools like simple wrenches are all that is needed to assemble the bed 100. In order to facilitate this, the components of the kit 100 are provided with their holes and cut-outs pre-formed in the proper locations. This can be reckoned by reference to FIG. 2.

Also, FIGS. 1 and 2 show that the components are pre-formed with multiple sets of un-used other holes and cut-outs which allow an end-user to convert the size of the bed into multiple other sizes. This is better shown by FIG. 5 as well as 6a through 6d.

Figure 5:
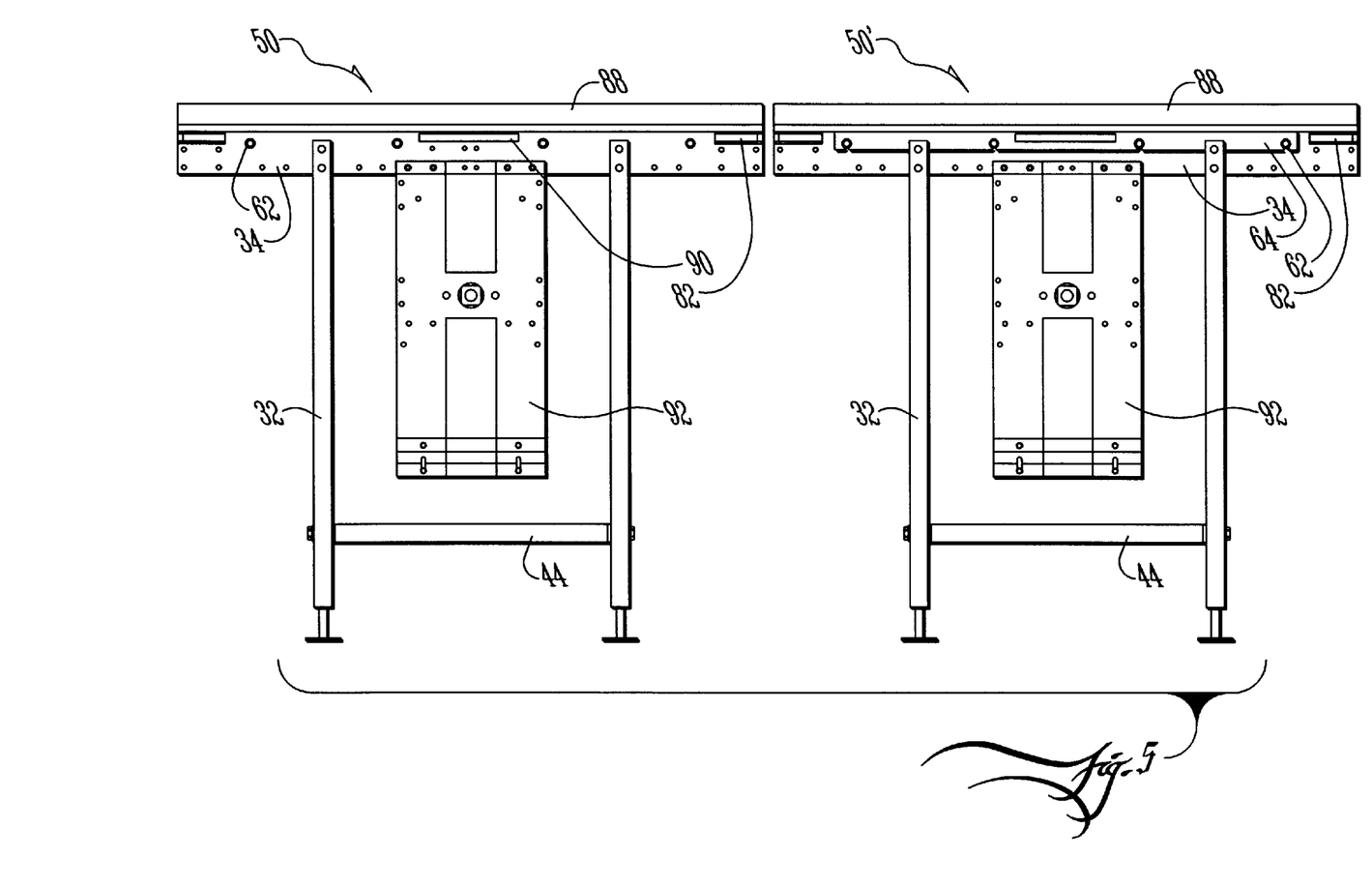
FIG. 5 is a near-side elevational view showing what was originally the convertible conveyor bed of FIG. 1 except after having been converted into two relatively equal half-sized beds by the method in accordance with the invention.

FIG. 5 shows that the full-sized bed of FIG. 1 (ie., 100) has been partitioned in half to give two relatively equal half-size beds 50 and 50' as shown. To do this, the end-user has merely had to saw the side racks 34 and bumpers 88 in half, and then also cut in two and shape to size the wear bars 64 and axial stem 44 of the leg bracing (although the leg bracing 42 may be optionally omitted in the shorter conversions of the bed). Additionally, the end-user would have to procure extra duplicates of at least the following, ie.:—a duplicate set of four (4) legs 32, a duplicate set or two (2) nose bars 82, and a duplicate of the drive console 92. The complete set of eight rungs 62 are divided up for use in equal measure in both bed halves 50 and 50'. Given that, the end-user can convert, say, one eight foot (2.4 m) bed into two four foot (1.2 m) beds.

Figure 6A:
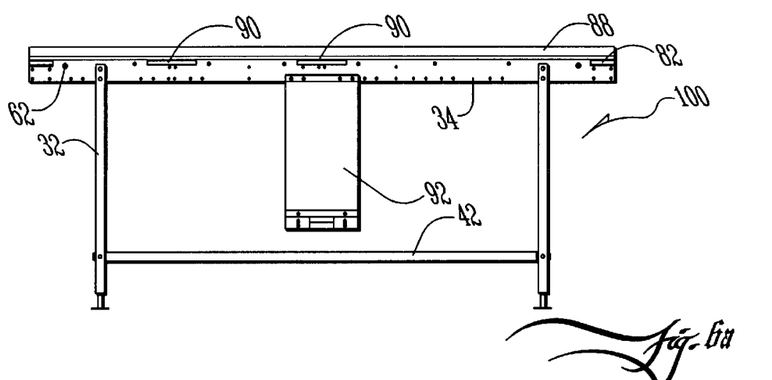
FIG. 6a shows the full-sized version of the bed, and as shown by FIG. 1.
Figure 6B:
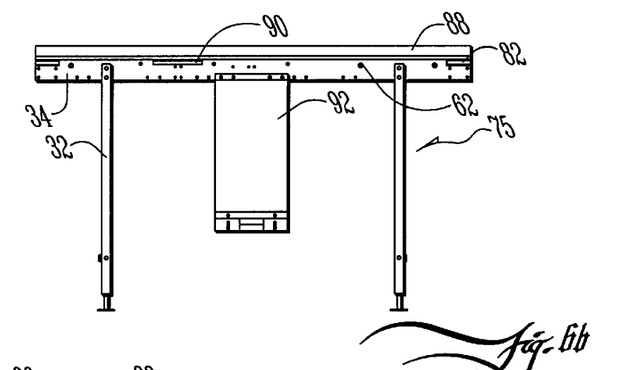
FIG. 6b shows one product of the method of conversion in accordance with the invention, which corresponds to a three-quarters sized bed.
Figure 6C:
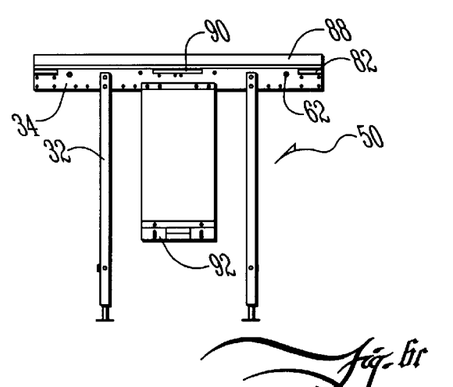
FIG. 6c shows an alternate product of the method of conversion in accordance with the invention, corresponding generally to one or the other of the half-sized beds shown by FIG. 5, and, FIG. 6d shows another product of the method of conversion in accordance with the invention, which in this view corresponds to a one-quarter sized bed.
Figure 6D:
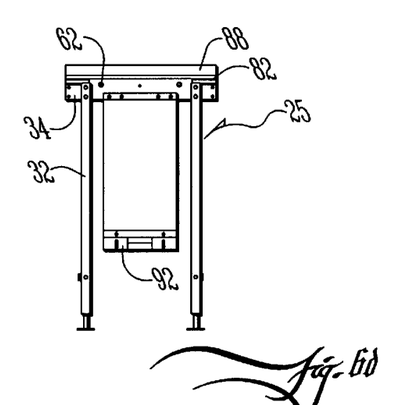

Indeed, FIGS. 6a through 6d show that the bed 100 can be partitioned into quartiles as follows. FIG. 6a shows what comprises the full-sized version of the bed 100 as it is shown more particularly by FIG. 1. FIG. 6b shows one product 75 of the method of conversion in accordance with the invention, which corresponds to a three-quarters sized bed 75 relative to the full-sized bed 100 of FIG. 1. FIG. 6c shows an alternate product 50 of the method of conversion in accordance with the invention, corresponding generally to one or the other of the half-sized beds 50 shown more particularly by FIG. 5. FIG. 6d shows yet another product 25 of the method of conversion in accordance with the invention, which in this view corresponds to a one-quarter sized bed 25.

Again, it is an inventive aspect that, for example, the racks 34 are pre-punched or cut with all the holes and cut-outs needed to complete any of beds 25, 50, 75 and/or 100. This can be reckoned with reference to the sets of enclosed slots 90 shown in the racks 34 in FIGS. 1 or 2. When the racks 34 are sawed in half through the middle of any of these slots 90, they are thus thereby converted into becoming the open mortises for accepting the sliding insertion of the nose bars 82.

Figure 7:
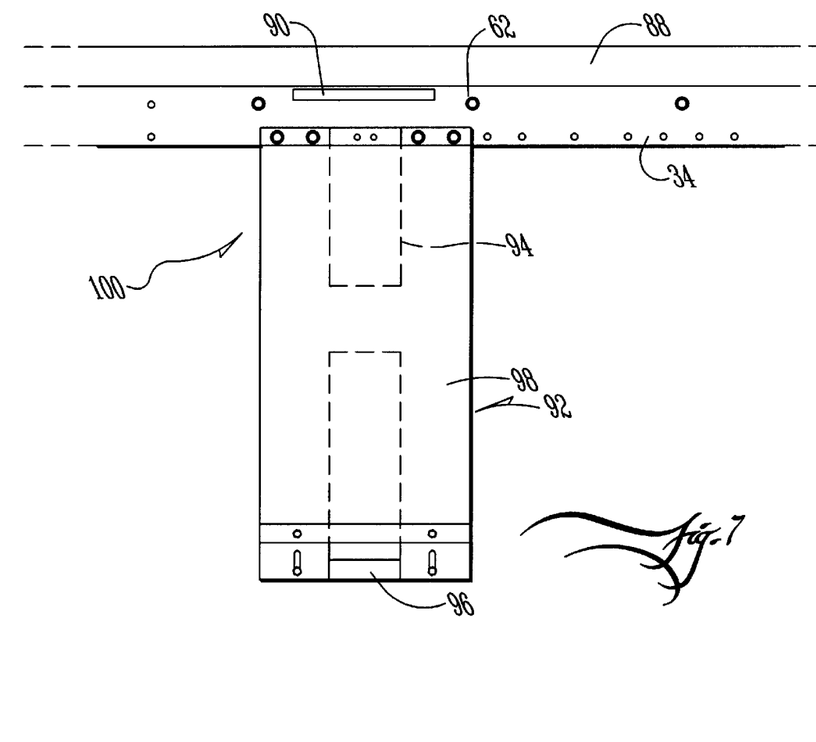
FIG. 7 is an enlarged-scale near-side elevational view of FIG. 1, with portions broken away, concentrating on the hanging arrangement of the drive console.
Figure 8:
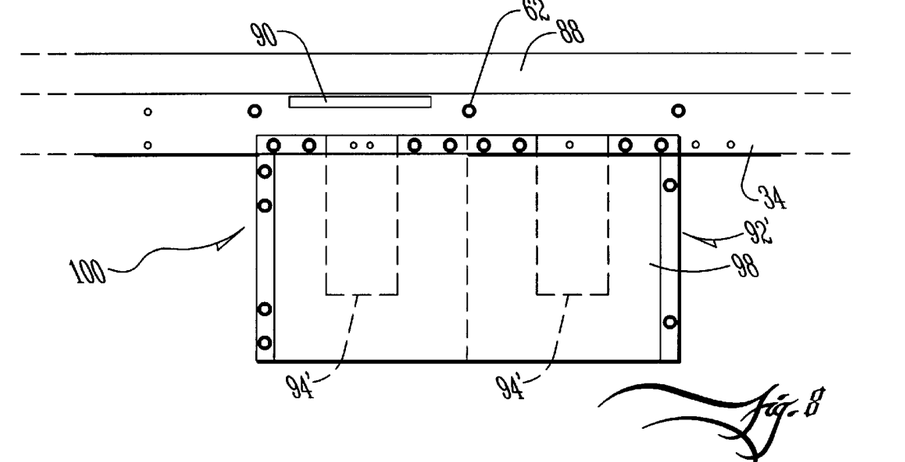
FIG. 8 is a view comparable to FIG. 7 except showing a converted arrangement of the hanging drive console.

FIG. 7 is an enlarged-scale near-side elevational view of FIG. 1, with portions broken away, isolating on the hanging arrangement of the drive console 92. It too is convertible into at least the arrangement shown by FIG. 8. The converted arrangement 92' involves partitioning the H-shaped hangers 94 in half and then hanging the halves 94' in side-by-side positions. The chain cover 98 then mounts sideways.

Figure 3:
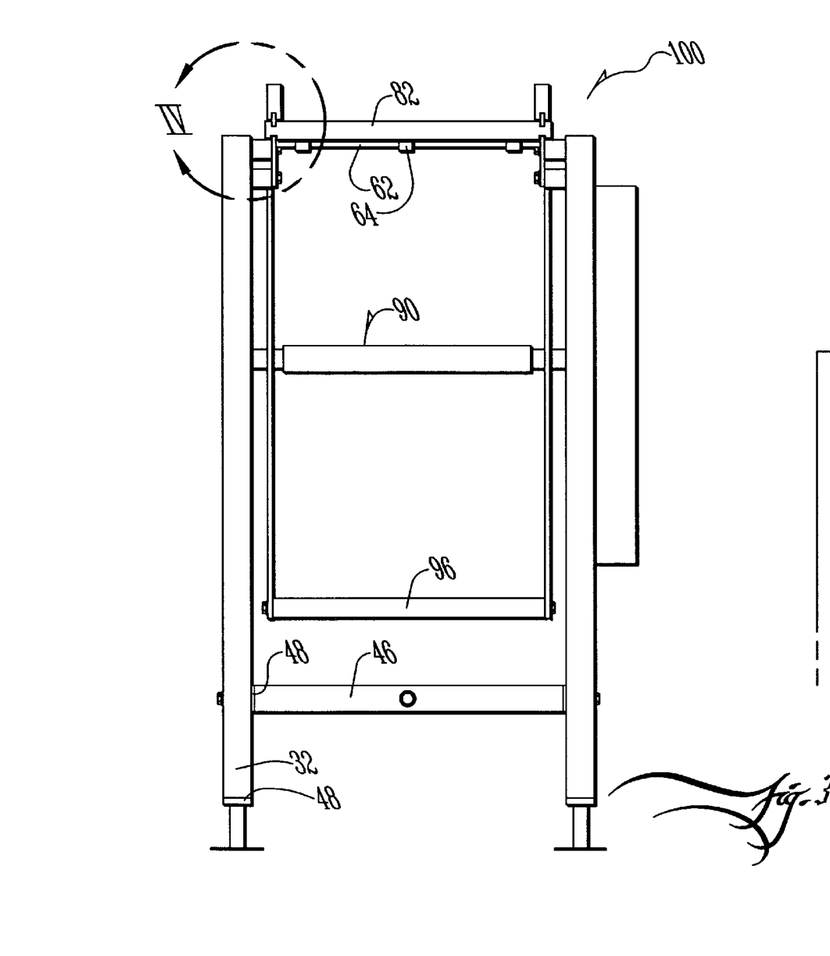
FIG. 3 is an enlarged-scale end elevational view of FIG. 1.

Whereas FIGS. 6a through 6d show that the run length of the bed 100 can be converted from full size to various fractional sizes 75/50/25, there is shown by FIG. 3 the aspect that the bed 100's width can be varied by replacement rungs 62 and cross bars 46, as well as parts of the drive console 90. That way, a belt of a different width can be accommodated at a later date.

Figure 9:
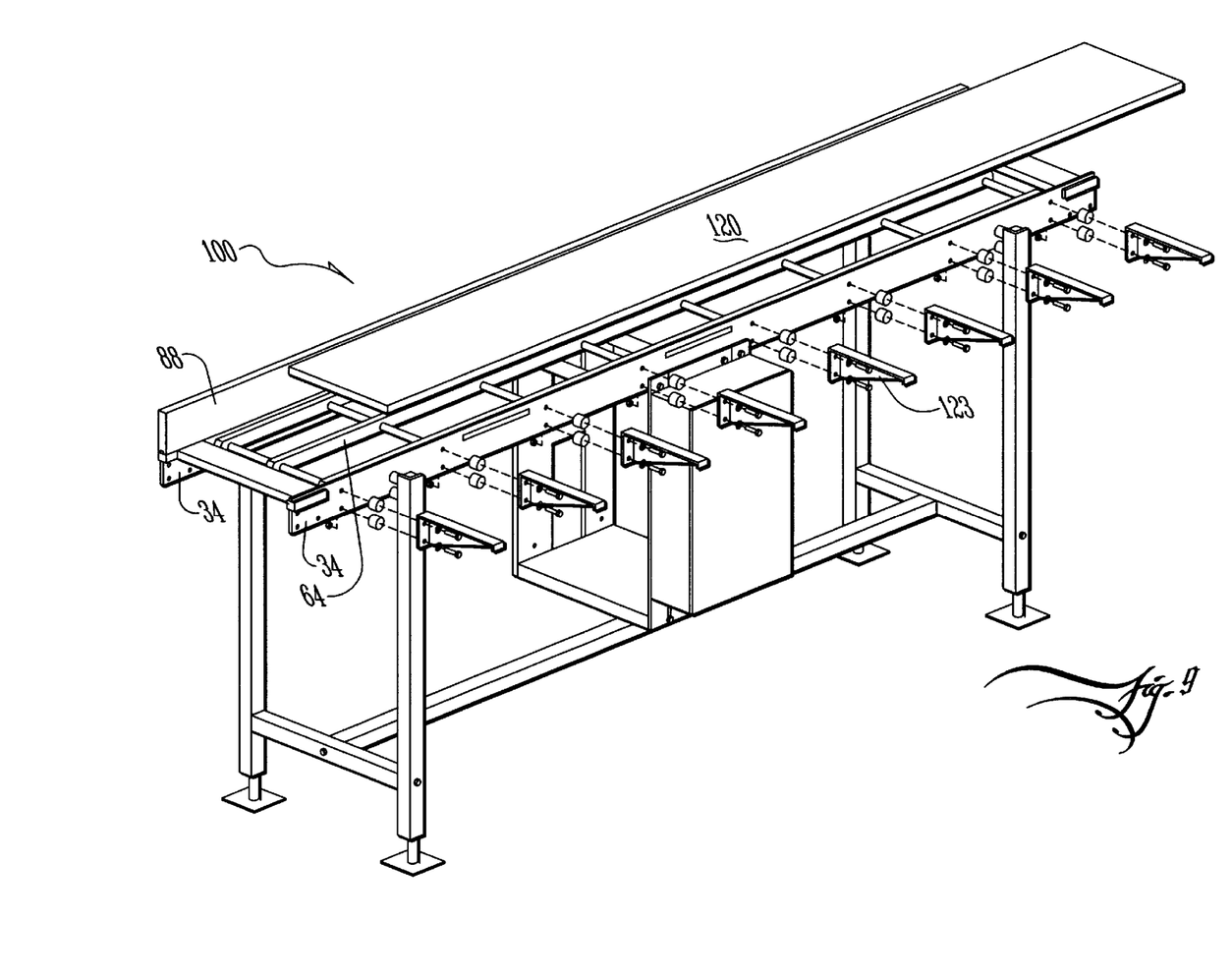
FIG. 9 is a perspective view of a side board accessory in accordance with the invention for any of the conveyor beds of any of FIGS. 1 et seq., wherein the side board and its support brackets are shown detached in order to illustrate the preferred manner of attachment.
Figure 10:
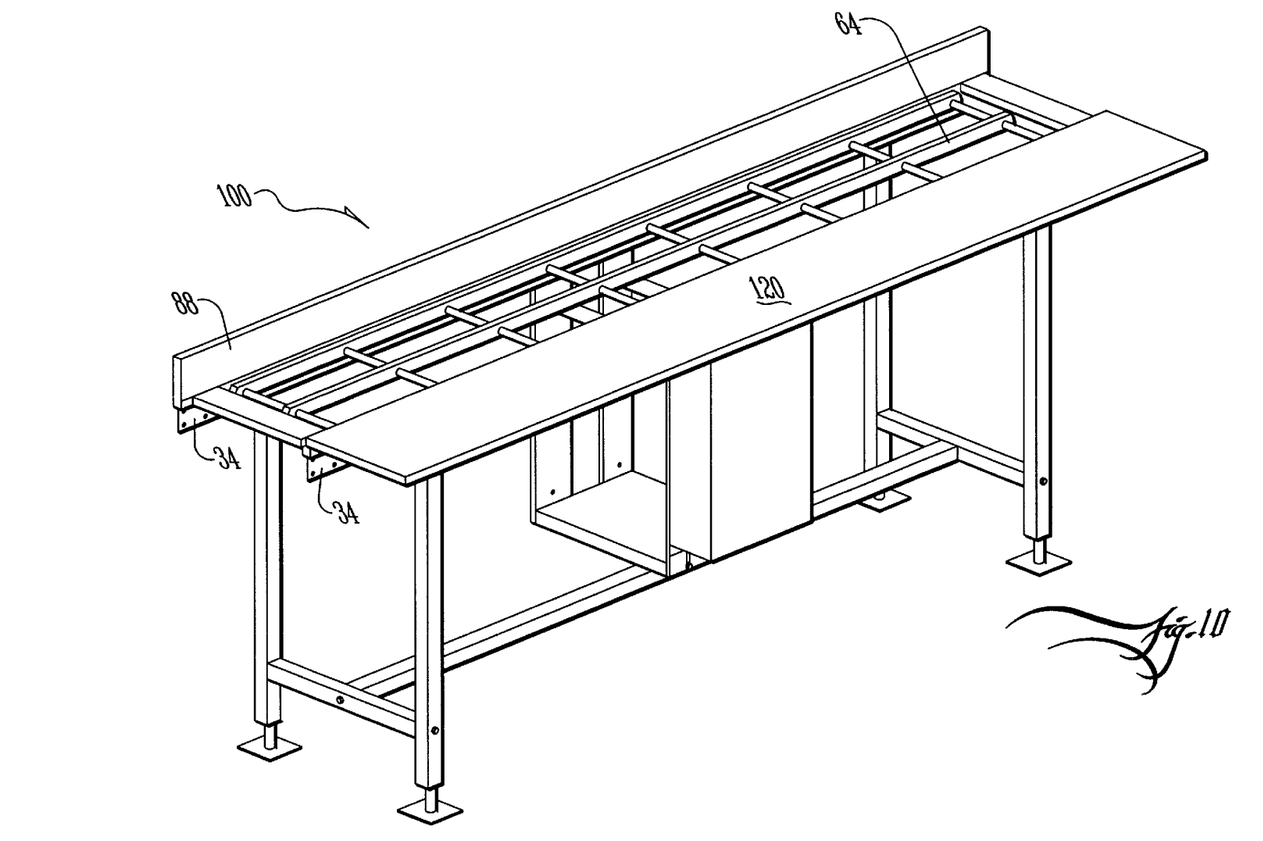
FIG. 10 is a perspective view comparable to FIG. 9 except showing the side board accessory attached.

FIGS. 9 and 10 show a side board accessory 120 in accordance with the invention for use with any of the conveyor beds 25, 50, 75 or 100 and so on of any of FIGS. 1 et seq. The side board 120 is substituted for one of the bumpers 88. To revisit the matter of bumpers 88, FIG. 9 shows that the elongated top edge of the far-side rack 34 is capped with the bumper 88 that acts like a fence. The bumper 88 is preferably made out of UHMW PET or the like. To go back to FIG. 1, it shows the assembly of a pair of bumpers 88. FIG. 2 shows the near-side bumper 88 in a condition of pre-assembly or disassembly. FIG. 4 shows the tongue-and-groove connection between the rack 34's upper edge and the bumper 88's grooved bottom. As was true with the wear bars 64, the bumpers 88 disconnect easily, partly to facilitate ease of maintenance as for strip-down-and-cleaning operations.

Returning to FIG. 9 or 10, each shows that the side board 120 has an elongated groove formed along the inboard margin of its bottom. The groove in the side board 120 is formed and sized to fit onto the near-side rack 34's elongated top edge. Hence the groove helps align the side board 120 in position. The side board 120 provides a work surface for workers (none are shown) stationed alongside the conveyor bed 25, 50, 75 or 100 and so on. For instance, the workers may be equipped with knives so that, as chicken pieces (eg.) traverse by, the workers may select out ones for special trimming on the work surface of the side board (none of this is illustrated). To support the side board 120 for this duty, it has a series of gusseted brackets 123 which are fastened to the near-side rack 34 of the conveyor bed 25, 50, 75, or 100 and so on. Preferably the side board 120 is not mechanically fastened. That is, the side board 120 preferably merely rests on the support brackets 123. The side board 120 is stabilized from shifting merely by the tongue-and-groove like connection between its groove and the near-side rack 34's elongated top edge. That way, the side board 120 lifts off easily for convenience of maintenance like strip-down-and-cleaning operations.

Figure 11:
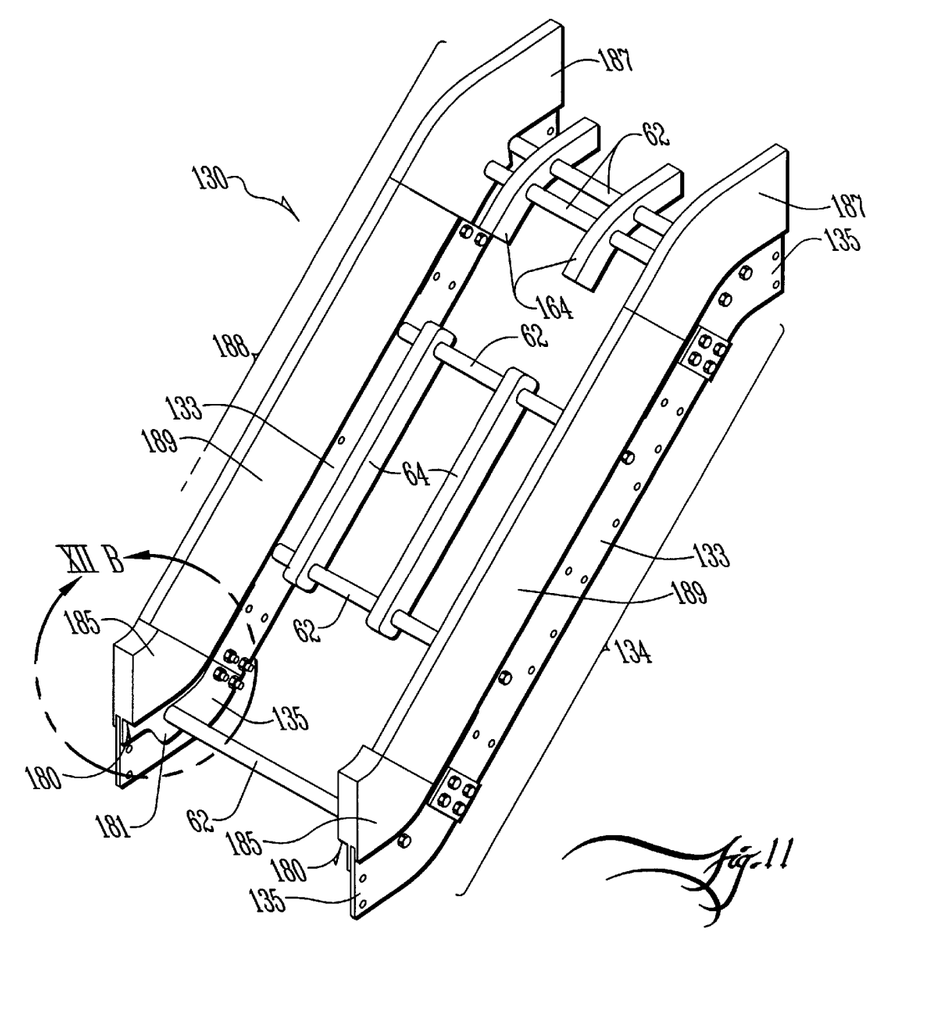
FIG. 11 is a perspective view of an incline bed in accordance with the invention for linking any two conveyor beds of FIGS. 1 et seq. which run a different elevations wherein the incline bed facilitates the transition between the one elevation and the succeeding elevation.

FIG. 11 is a perspective view of an incline bed 130 in accordance with the invention for linking any two conveyor beds 25, 50, 75 or 100 and so on of any of FIGS. 1 et seq (not shown). More particulary, the incline bed 130 facilitates the transition between one conveyor bed (none shown in FIG. 11) providing a run at one elevation and a succeeding conveyor bed (likewise none shown in FIG. 11) providing a run, at a succeeding elevation.

The incline bed 130 comprises opposite side-rack assemblies 134 which, as shown, are assembled from a central straight piece 133 flanked between radius-defining end pieces 135. The side-rack assemblies 134 are laterally spaced apart by a series of rungs 62. The interior, or mid-elevation set of rungs 62 support a set of appropriately-sized lengths of straight wear bars 64. The upper set of rungs 62 support a set of radius-defining wear shoes 164. At least one lower rung 62 is provided for reasons more particularly described below.

The elongated upper edges of the of the side-rack assemblies 134 support respective bumper assemblies 188. Each bumper assembly 188 comprises a central straight piece 189 flanked between an upper and lower end piece 187 and 185. All the bumper pieces 189, 187 and 185 are formed with respective grooves to fit onto the free upper edges of the side-rack assemblies 134 in accordance with a convenient, bolt-less, tongue-and-groove fashion.

Figures 12A, 12B:
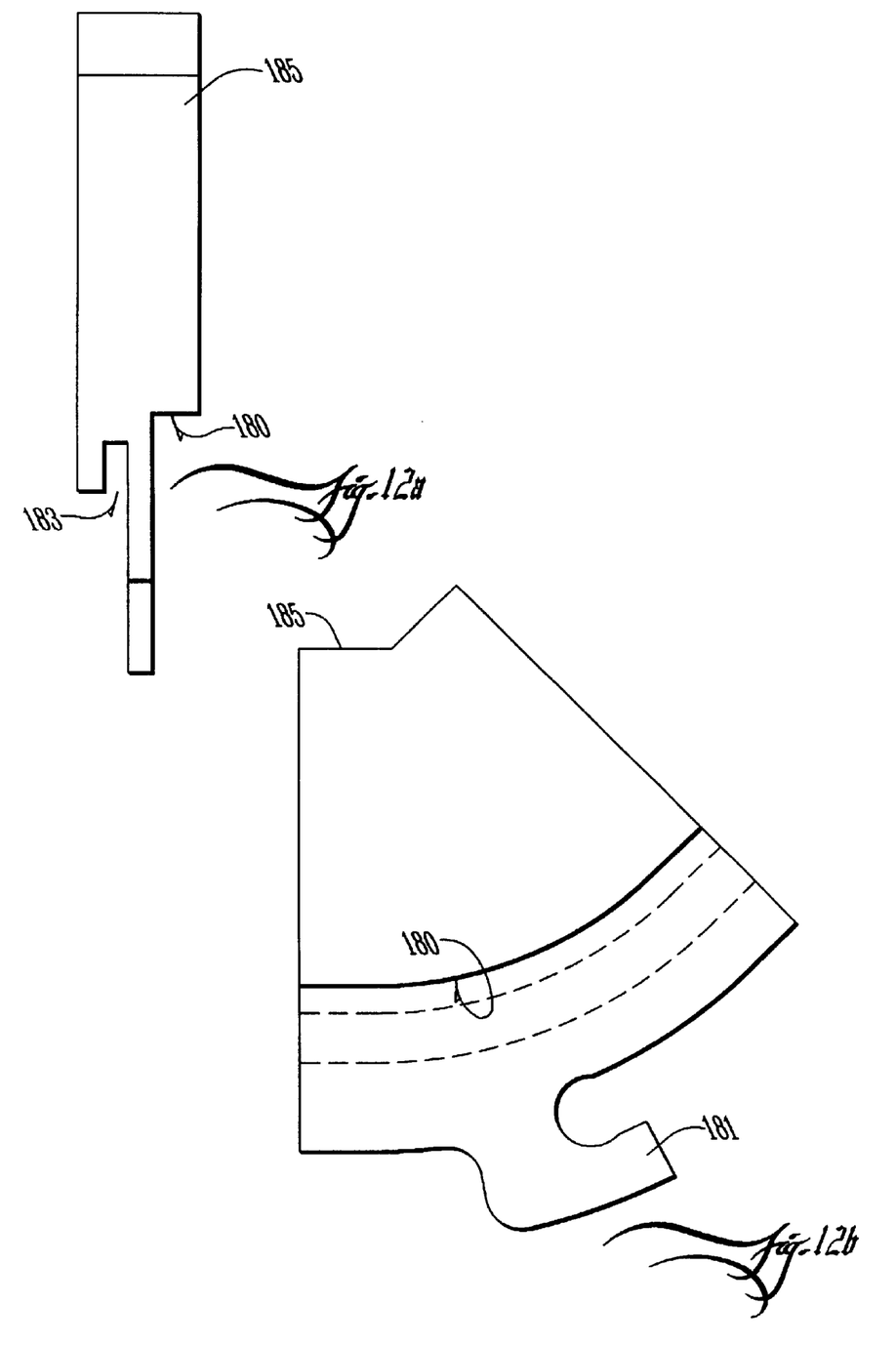
FIG. 12a is an end elevational view of the left end of FIG. 12b.
FIG. 12b is an enlarged scale side elevational view of the inboard side of the lower bumper end of detail XIIB in FIG. 11 in order to show its overhanging ledge that acts to hold a conveyor belt down.

FIG. 12b is an enlarged-scale side elevational view of the inboard side of the lower bumper end 185 indicated by detail XIIB in FIG. 11. FIG. 12a is an end elevational view of the left end of FIG. 12b. To go back to FIG. 11, it shows that the lower bumper ends 185 are thicker across their tops than are the central or upper-end bumper pieces 189 or 187. They are simply narrower. FIG. 12a shows the purpose of the lower end 185's extra thickness. The extra thickness allows the development in the lower bumper end 185 of an overhanging ledge 180. The ledge 180 is sized and arranged to lap over a margin of the belting (not shown) that slides under the ledge 180. That way, the ledge 180 provides positive contact on the edge of the sliding belt (not shown) in order to hold the belt down and thus prevent it from short-cutting the inside angle (eg., the angle which is less than 180°). Such a ledge 180 is not needed in the upper-bumper ends 187 because they are astride an outside angle (eg., an angle greater than 180°). The belt (not shown) will by its own weight and tension naturally remain in contact on the wear shoes 164 there as the belt (not shown) just rolls right over the wear shoes 164. But tension in the belt (again, not shown) will tend to lift the belt up out of an inside angle.

Accordingly, since at the lower bumper ends 185 the belt will tend to lift up unless held down, the function provided by the opposing ledges 180 formed in the opposite lower bumper ends 185 is to indeed hold the belt down. The preferred belting (not shown) is likely plastic modular belting, which is well known in the art, although many other suitable belting candidates will suffice in this environment. A characteristic feature of most kinds of belting is a construction allowing easy separation about anywhere in a middle to make free tag ends. This allows consequent removal of such belting from the conveyor beds 25, 50, 75, 100 and/or 130 and so on in order to allow ease of maintenance as for strip-down-and-cleaning operations. Such separated belting is likewise characteristically constructed to allow fast and easy re-connection of the tag ends. In use of the ledges 180, preferably the belting is separated so that a belt tag-end may be threaded under the ledges. Once that is accomplished, the separated tag-ends are re-united. The belt is thus ready for operation in association with the work provided by the hold-down ledges 180. The ledges 180 contact the opposite marginal edges of the belting and thus hold it down as well as define a radius for the belting.

The lower bumper ends 185 are preferably secured against lifting up as they have to provide the opposing downward force in opposition to the belting's tendency to lift up. This can be accomplished by a variety of factors. The groove 183 (see FIG. 12a) in the lower bumper end 185 is sized to tightly grip the anchoring rack piece's 135 free upper edge. Also, the lower bumper end 185 is preferably provided with a hook formation 181 that reaches out and latches onto the lower rung 62 (see, eg., FIG. 11). Moreover, the lower bumper end 185 is wedge-shaped and, like an inverted keystone in an arch, may be pinched upon by its neighboring bumper pieces 88 and 189. Any one or combination of the foregoing allows the lower bumper ends 185 to be assembled or disassembled without need of fastening or unfastening by bolts or screws or the like while additionally insuring positional stability. That way, the lower bumper ends 185 may be removed easily for convenience of maintenance like strip-down-and-cleaning operations, and then put back on just as easily.

The bumper assemblies 188 and wear shoes and bars 164 and 64 are all preferably formed of a suitable plastic material like the aforementioned UHMW PET.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A conveyor bed comprising:
a pair of opposed side members,
a plurality of transverse members adapted to be connected between the side members to form a ladder-like bed assembly, and,
a plurality of elongated wear strips to lay on and releasably couple to the transverse members at spaced positions between the opposed sides in order to form a deck for supporting a sliding conveyor thereon;
wherein either the wear strips or the transverse members are formed with a recess portion as the other of the transverse members or wear strips have portions forming an inter-positioning portion such that the wear strips and transverse members releasably couple or uncouple by the inter-positioning portion being received in or separated from a given recess therefor by relative movement along a direction generally perpendicular to a plane of the deck, which thereby facilitates ease of frequent cycles of disassembly and re-assembly for maintenance operations such as hose-down or cleaning operations; and,
wherein the transverse members comprise rungs and the wear strips have an upper edge forming a conveyor supporting surface and a lower edge formed with a series of notches for receiving the rungs, whereby said notched wear strips are adapted to gain positional stability on the rungs from the weight of the conveyor sliding across the upper edge.

2. The conveyor bed of claim 1 wherein the rungs have an outer surface which defines a plurality of inter-positioning portions, and the notches are formed with the recess portions.

3. The conveyor bed of claim 1 wherein the wear strips are notched for closely fitting the rungs in order to further stabilize the wear strips from displacement on the rungs.

4. A conveyor bed, comprising:
a pair of opposed side members which extend between opposite ends;
a pair of transverse nose bars adapted to be connected between respective pairs of the ends of the side members and thus form a frame;
a deck adapted to situate amid the side members and nose bars and be supported there for supporting a sliding conveyor thereon;
wherein either the nose bars or the side members are formed with recess portions as the other of the side members or nose bars have portions forming inter-positioning portions such that the nose bars and side members releasably couple or uncouple by the inter-positioning portions being received in or separated out of a given recess therefor by relative movement along a direction generally common with a plane of the deck, whereby said nose bars are adapted to gain positional stability on the ends of the side members by the felt weight of the conveyor rolling over the nose bars, and whereby the recess and inter-positioning portions are adapted to facilitate ease of frequent cycles of disassembly and re-assembly for maintenance operations such as hose-down or cleaning operations.

5. The conveyor bed of claim 4 wherein the side members' ends are formed with open slideways which define said recess portions and the nose bars extends between lateral edges formed with corresponding slide portions which define said inter-positioning portions.

6. The conveyor bed of claim 4 wherein the side members' ends are formed with open mortises which define said recess portions and each nose bars extends between spaced lateral edges formed with T-headed tenon portions which define said inter-positioning portions.

7. The conveyor bed of claim 6 further comprising the side members being formed with elongated apertures intermediate each's ends,
wherein the side members are convertible from a given length between the ends to a reduced length by severing each side member through a given elongated aperture into at least one use piece and another piece such that the severed aperture in the use piece serves as a succeeding open mortise for accepting a given T-headed tenon of one of the nose bars, whereby the nose bars are re-usable without modification.

8. The conveyor bed of claim 7 wherein the deck is formed of longitudinal members at least in part which are sizable by severance therethrough to fit between the nose bars of the reduced-length side members.

9. The conveyor bed of claim 4 further comprising the side members being formed with the recess portions and further being formed with elongated apertures intermediate each's ends,
wherein the side members are convertible from a given length between the ends to a reduced length by severing each side member through a given elongated aperture into at least one use piece and another piece such that the severed aperture in the use piece serves as a succeeding recess portion for accepting a given inter-positioning portion of one of the nose bars, whereby the nose bars are re-usable without modification.

10. A conveyor bed, comprising:
a pair of opposed side members which extend between opposite ends;

a pair of transverse nose bars adapted to be connected between respective pairs of the ends of the side members and thus form a frame;

a plurality of other transverse members adapted to be connected between the side members intermediate the nose bars on the ends to form a ladder-like assembly, and, a plurality of elongated wear strips to lay on and releasably couple to the transverse members at spaced positions between the opposed side members and intermediate the nose bars to form a deck for supporting a sliding conveyor thereon;

wherein either the wear strips or transverse members are formed with recess portions as the other of the transverse members or wear strips have portions forming inter-positioning portions such that the wear strips and transverse members releasably couple or uncouple by the inter-positioning portions being received in or separated out of a given recess therefor by relative movement along a direction generally perpendicular to a plane of the deck, which thereby facilitates ease of frequent cycles of disassembly and re-assembly for maintenance operations such as hose-down or cleaning operations; and wherein either the nose bars or the side members are formed with slideway portions as the other of the side members or nose bars have portions forming slide portions such that the nose bars and side members releasably couple or uncouple by the slide portions being received in or separated out of a given slideway therefor by relative movement along a direction generally common with the plane of the deck, whereby said nose bars are adapted to gain positional stability on the ends of the side members by the felt weight of the conveyor rolling over the nose bars, and whereby the slideway and slide portions are adapted to facilitate ease of frequent cycles of disassembly and re-assembly for maintenance operations such as hose-down or cleaning operations.

11. The conveyor bed of claim 10 wherein the side members' ends are formed with open mortises which define said slideway portions and each nose bars extends between spaced lateral edges formed with T-headed tenon portions which define said slide portions.

12. The conveyor bed of claim 11 further comprising the side members being formed with elongated apertures intermediate each's ends, wherein the side members are convertible from a given length between the ends to a reduced length by severing each side member through a given elongated aperture into at least one use piece and another piece such that the severed aperture in the use piece serves as a succeeding open mortise for accepting a given T-headed tenon of one of the nose bars, whereby the nose bars are re-usable without modification.

13. The conveyor bed of claim 12 wherein the elongated wear strips are sizable by severance therethrough to fit such severed wear strips between the nose bars of the reduced-length side members.

14. The conveyor bed of claim 10 further comprising the side members being formed with elongated apertures intermediate each's ends, wherein the side members are convertible from a given, length between the ends to a reduced length by severing each side member through a given elongated aperture into at least one use piece and another piece such that the severed aperture in the use piece serves as a succeeding slideway for accepting a given slide of one of the nose bars, whereby the nose bars are re-usable without modification.

15. The conveyor bed of claim 10 wherein the transverse members comprise rungs and the wear strips have an upper edge forming a conveyor supporting surface and a lower edge formed with a series of notches for receiving the rungs, whereby said notched wear strips are adapted to gain positional stability on the rungs from the weight of the conveyor sliding across the upper edge.

16. The conveyor bed of claim 15 wherein the wear strips are notched for closely fitting the rungs in order to further stabilize the wear strips from displacement on the rungs.

17. An inclined conveyor bed inclined between a lower end and an upper end and which lower end is positioned adjacent another conveyor bed wherein said inclined and other conveyor beds are serviced by a same belt, said inclined conveyor bed comprising:

a pair of opposite side members which extend between spaced upper and lower end portions, wherein at least each lower end portion provides an upper free edge;

an inclined deck adapted to situate amid the side members and end portions thereof and be supported there for supporting a sliding conveyor thereon;

opposite lower end members provided with a groove for accommodating the upper free edge of the corresponding lower end portion;

wherein either the lower end members or the lower end portions are formed with hook formations as the other of the lower end portions or lower end members have portions forming inter-positioning portions such that lower end members and lower end portions releasably couple or uncouple by the inter-positioning portions being received in or separated out of a given hook formation therefor, whereby said lower end members are adapted to eliminate upward shifting on the lower end portions and whereby the hook formation and inter-positioning portions are adapted to facilitate ease of frequent cycles of disassembly and re-assembly for maintenance operations such as hose-down or cleaning operations; and, wherein the opposite lower members are formed with opposed overhanging ledges to lap over marginal edges of the conveyor belt sliding thereunder in order to hold prevent the tension of the belt from lifting up out of a transverse axis defined between the ledges.

18. The inclined conveyor bed of claim 17 wherein each lower end member is formed with an inverted hook formation and the opposite lower end portions are spaced by a transverse member which defines the corresponding inter-positioning portions.

19. The inclined conveyor bed of claim 17 wherein said lower end members are produced from a material having a low coefficient of sliding friction.

* * * * *